(12) United States Patent
Wanasundara et al.

(10) Patent No.: US 8,946,461 B2
(45) Date of Patent: Feb. 3, 2015

(54) RECOVERY AND PURIFICATION OF HYDROXY FATTY ACIDS FROM SOURCE OILS

(75) Inventors: Udaya Wanasundara, Saskatoon (CA); Jack Grushcow, Vancouver (CA); Lui Shuanghui, Saskatoon (CA)

(73) Assignee: Linnaeus Plant Sciences Inc., Vancouver (CA)

( * ) Notice: Subject to any disclaimer, the term of this patent is extended or adjusted under 35 U.S.C. 154(b) by 256 days.

(21) Appl. No.: 13/698,153

(22) PCT Filed: May 17, 2011

(86) PCT No.: PCT/CA2011/000579
§ 371 (c)(1),
(2), (4) Date: Mar. 22, 2013

(87) PCT Pub. No.: WO2011/143753
PCT Pub. Date: Nov. 24, 2011

(65) Prior Publication Data
US 2013/0190519 A1    Jul. 25, 2013

Related U.S. Application Data

(60) Provisional application No. 61/345,379, filed on May 17, 2010.

(51) Int. Cl.
*C11B 7/00* (2006.01)
*C11B 1/06* (2006.01)
(Continued)

(52) U.S. Cl.
CPC .................. *C11B 7/0025* (2013.01); *C11B 1/06* (2013.01); *C11B 1/10* (2013.01); *C11C 1/02* (2013.01); *C11C 3/003* (2013.01); *Y02E 50/13* (2013.01)
USPC ......................................................... 554/206

(58) Field of Classification Search
None
See application file for complete search history.

(56) References Cited

U.S. PATENT DOCUMENTS 1,955,021 A * 4/1934 Rider ............................ 554/199
2,045,727 A * 6/1936 Rider ............................ 554/174
(Continued)

FOREIGN PATENT DOCUMENTS

FR           1023247  *  3/1953    ................ C11C 3/00
WO    WO 2009/109985      9/2009

OTHER PUBLICATIONS

FR 1023247, Caompagnie De Products Chimiques Et Eletrometallurgiques Alais, Froges & Camargue, Purification of ricinoleic acid derivatives esters, 1953, English translation, 3 pages.*
Hayes, D., Free fatty acid fractionatin via urea inclusion compounds, 2002, Inform, vol. 13, pp. 832-834.*
(Continued)

*Primary Examiner* — Yate K Cutliff
(74) *Attorney, Agent, or Firm* — Fulbright & Jaworski LLP

(57) ABSTRACT

A process for recovering, purifying and enriching hydroxy fatty acids from source oils. The process comprises the steps of: (a) methylating the source oil to form therein hydroxy fatty acid methyl esters and non-hydroxy fatty acid methyl esters; (b) separating the hydroxy fatty acid methyl esters from the non-hydroxy fatty acid methyl esters with an organic solvent mixture comprising a pentane/hexane and a short-chain alcohol; and (c) separately recovering the hydroxy fatty acid methyl esters and the non-hydroxy fatty acid methyl esters from the organic solvent mixture. Hydroxy fatty acids that can be recovered, purified and enriched with the process include ricinoleic acid, densipolic acid, lesquerolic acid, and auricolic acid. The non-hydroxy fatty acid methyl esters can be recovered, purified and further processed into biodiesel fuels and/or lubricants.

15 Claims, 3 Drawing Sheets

(51) Int. Cl.
*C11B 1/10* (2006.01)
*C11C 1/02* (2006.01)
*C11C 3/00* (2006.01)

(56) References Cited

U.S. PATENT DOCUMENTS 2,838,480 A * 6/1958 Swern et al. .................. 554/186
2007/0299272 A1 * 12/2007 Wanasundara ............... 554/174
2010/0305347 A1 * 12/2010 Wanasundara ............... 554/174

OTHER PUBLICATIONS

Hayes, D., et al., Urea-Based fractionation of seed oil samples containing fatty acids and acylglycerols of polyunsaturated and hydroxyl fatty acids, 2000, JAOCS, vol. 77, No. 2, pp. 207-213.*
International Search Report and Written Opinion issued in PCT Application No. PCT/CA2011/000579, mailed Aug. 17, 2011.
International Preliminary Report on Patentability issued in PCT Application No. PCT/CA2011/000579, mailed Nov. 20, 2013.
Philips et al., "Isolation & Composition of Triricinolein and Ricinoleic Acid from Castor Oil", *Indian Journal of Technology*, 1(11):427-431, 1963.

* cited by examiner

RECOVERY AND PURIFICATION OF HYDROXY FATTY ACIDS FROM SOURCE OILS

CROSS-REFERENCE TO RELATED APPLICATIONS

The present application is a national phase application under 35 U.S.C. §371 of International Patent Application No. PCT/CA2011/000579, filed 17 May 2011, which claims priority to U.S. Provisional Patent Application No. 61/345,379, filed 17 May 2010. The entire contents of these applications are incorporated by reference.

FIELD OF THE INVENTION

This invention relates to processes for recovery, purification and enrichment of hydroxy fatty acids from source oils.

BACKGROUND

Oil recovered from castor seed (*Ricinus communis* L.) is an important raw material in many industrial processes and/or syntheses due to its high content (i.e., in the range of 80%-90%) of the hydroxy fatty acid (HFA) ricinoleic acid (Eq 1).

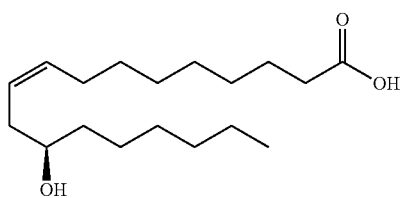

Eq 1

The highly reactive hydroxy groups can be engaged in various chemical reactions and result in diverse end products such as lubricants, coatings and pharmaceuticals. For example, after recovery from castor oil, ricinoleic acid may be further converted to sebacic acid and capryl alcohol. Sebacic acid can be polymerized with hexamethylene diisocyanate to produce nylon-6,10. Capryl alcohol can be used in the production of plasticizers. Dehydration of ricinoleic acid, which occurs at the hydroxyl group, produces conjugated double bond structures. Accordingly, ricinoleic acids can be used as semi-drying oils.

However, castor plants and their seeds contain ricin and ricinine that are extremely toxic to many organisms including mammals, avian species and marine life. Consequently, there are significant safety concerns associated with the harvesting and processing of castor seed crops to produce oil.

One strategy to overcome the disadvantages of working with castor seed and castor oil has been to genetically modify other types of oil-seed plants to produce ricinoleic acid. However, it has been found that in comparison to castor seed, such genetically transformed plants typically produce very low levels of ricinoleic acid. As a result, considerable efforts and expense are required to recover, purify and enrich ricinoleic acid and other HFA from source oils produced from genetically modified plants.

It is possible to recover the hydroxy fatty acids lesquerolic acid (14-hydroxy-11-eicosenoic acid) and auricolic acid (14-hydroxy-11,17-eicosadienoic acid) from *Lesquerella fendleri* and *Lesquerella gordonii* oils by a process incorporating low-temperature crystallization. *Lesquerella* oils are first hydrolyzed for 3 hours then acidified to obtain free fatty acids (FFA). The FFA are then extracted with hexane, washed with phosphate buffer and dried to recover the FFA. The FFA are then dissolved in hexane and chilled to −25° C. overnight to allow crystallization and separation of the HFA. Finally, HFA are filtered, washed and dried. Although this method enriched lesquerolic acid and auricolic acid from 55-59% to 85-99% with 94% yield, the process required large amounts of solvents, long processing times and carefully controlled processing temperatures (i.e. −25° C.).

Another method to isolate HFA from source oils is based on salt solubility fractionation. Potassium salts of ricinoleic acid are isolated from castor oil by their different solubilities in different solvent systems at certain temperatures. However, in addition to the complexity of the process, the method is not effective for the separation of ricinoleic acid from oleic acid and linoleic acid.

Other strategies assessed separation and recovery of HFA from source oils based on urea fractionation of the fatty acids. However, it was found that this approach is more useful for the separation and recovery of polyunsaturated fatty acids (PUFA) rather than HFA.

Other methods for recovery of HFA from source oils incorporate liquid-liquid extraction steps. These approaches are based on the polarities of FFA/FAME and their solubilities in bi-phase solvent systems. However, these processes are complex and require large amounts of solvents and long processing times.

SUMMARY OF THE INVENTION

The exemplary embodiments of the present invention relate to processes for recovering, purifying and enriching hydroxy fatty acids from source oils. The processes generally comprise the steps of: (a) methylating a source oil to form a blend of hydroxy fatty acid methyl esters and non-hydroxy fatty acid methyl esters; (b) separating the hydroxy fatty acid methyl esters from the non-hydroxy fatty acid methyl esters with an organic solvent mixture comprising methylpentane/hexane and a short-chain alcohol; and (c) separately recovering the hydroxy fatty acid methyl esters and the non-hydroxy fatty acid methyl esters.

Some exemplary embodiments relate to a process for the recovery, purification and enrichment of hydroxy fatty acids exemplified by ricinoleic acid (12-hydroxy-9-cis-octadecenoic acid), densipolic acid (12-hydroxy-cis-9,15-octadecadienoic acid), lesquerolic acid (14-hydroxy-cis-11-eicosenoic acid), and auricolic acid (14-hydroxy-cis-11,17-eicosadienoic acid), and the like.

Some exemplary embodiments of the present invention relate to processes for recovery and processing of non-hydroxy fatty acid methyl esters into biodiesel fuels and/or lubricants.

BRIEF DESCRIPTION OF THE DRAWINGS

The present invention will be described in conjunction with reference to the following drawing, in which.

DETAILED DESCRIPTION OF THE INVENTION

Figure 1:
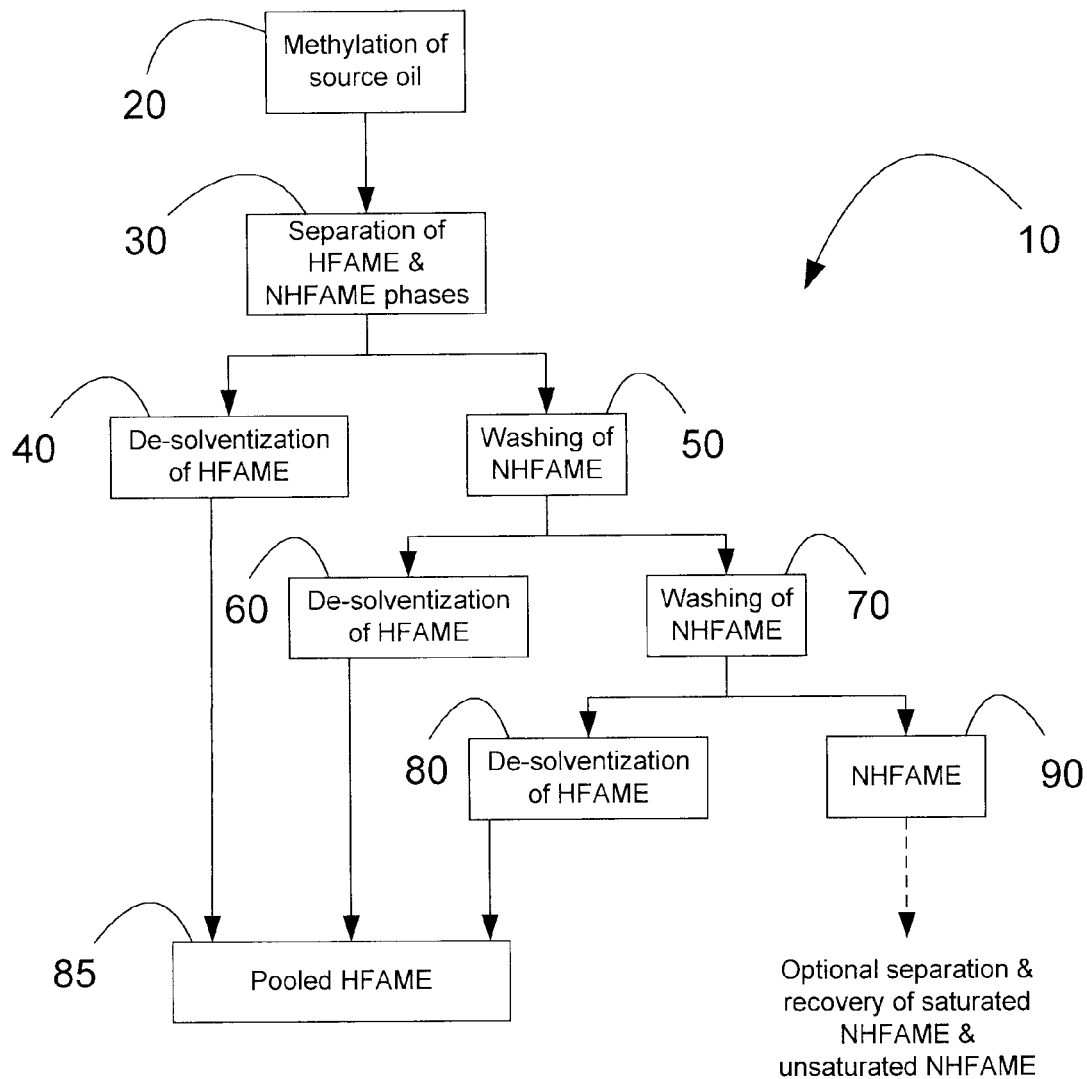
FIG. 1 is a schematic flowchart showing an exemplary process of the present invention for separation and recovery of hydroxy fatty acids from a source oil.

Unless otherwise defined, all technical and scientific terms used herein have the same meaning as commonly understood by one of ordinary skill in the art to which this invention belongs. In order that the invention herein described may be fully understood, the following acronyms, terms and definitions are provided herein.

As used herein, the term "depleted" means lessened in quantity or content.

As used herein, the term "enriched" means increased in quantity or content.

As used herein, the term "selective" means to take by preference so as to increase the percentage of the selected object(s), item(s) or thing(s) in the selected portion.

As used herein, FFA means free fatty acids.

As used herein, FAME means fatty acid methyl esters.

As used herein, HFA means hydroxy fatty acids.

As used herein, HFAME means hydroxy fatty acid methyl esters.

As used herein, NHFA means non-hydroxy fatty acids.

As used herein, NHFAME means non-hydroxy fatty acid methyl esters.

The exemplary embodiments of the present invention relate to processes for the recovery of HFA from source oils. Some aspects relate to purification of the recovered HFA. Some aspects relate to processes for the concentration of and/or enrichment of purified HFA. Source oils are derived from plant materials containing HFA. Exemplary plant materials include seeds, nuts, stems, leaves, tubers and the like. The plant materials may be harvested or otherwise recovered from plants that are naturally occurring and/or hybridized and/or genetically modified and/or genetically engineered. Suitable plants are exemplified by those producing high-oil content grain or seeds or nuts that comprise HFA, including but not limited to castor bean, camelina, legumes, palms, *Lesquerella* sp., genetically modified *Brassica* sp., genetically modified *Brassicacea* sp., genetically modified camelina, genetically modified *Lesquerella* sp., genetically modified maize, genetically modified legumes, and genetically modified palm. Particularly suitable are non-food-use host plants that have been genetically engineered with a gene sequence coding for expression of one or more HFA (i.e., ricinoleic acid and/or densipolic acid and/or lesquerolic acid and/or auricolic acid) operably linked to a promotor. Surprisingly, it has been found that the processes of the present invention are useful for recovering HFAME from seed or nut oils from genetically engineered plants wherein the source oils contain less than 6% HFAME by weight, and then purifying and concentrating the HFAME from the source oils to about 68% w/w and greater.

Exemplary hydroxy fatty acids that can be recovered and/or purified and/or enriched by the processes of the present invention include ricinoleic acid (12-hydroxy-9-octadecadienoic acid), densipolic acid (12-hydroxy-9,15-octadecadienoic acid), lesquerolic acid (14-hydroxy-cis-11-eicosenoic acid), and auricolic acid (14-hydroxy-11,17-eicosadienoic acid), among others.

Certain exemplary embodiments of the present invention relate to processes for concurrent or sequential recovery of HFA and NHFA from source oils. Some aspects relate to separate purification of the recovered HFA and NHFA. Some aspects relate to separate concentration and/or enrichment of the purified HFA and NHFA. Suitable source oils are derived from plant materials containing HFA and NHFA, for example derived from seeds or nuts produced by plants. The plants may be naturally occurring, hybridized, genetically modified, and/or genetically engineered. Suitable plants are exemplified by those producing high-oil content grain or seed or nuts that comprise HFA, including but not limited to castor bean, camelina, *Lesquerella* sp., genetically modified *Brassica* sp., genetically modified *Brassicacea* sp., genetically modified camelina, genetically modified *Lesquerella* sp., genetically modified maize, genetically modified legumes, and genetically modified palm. Particularly suitable are non-food-use host plants that have been genetically engineered with a gene sequence coding for expression of ricinoleic acid. Surprisingly, it has been found that the processes of the present invention are useful for recovering HFA from seed or nut materials containing less than 6% HFA by weight, then purifying and enriching the HFAME to about 68% w/w and greater, while concurrently recovering, purifying and enriching the NHFAME to about 90% w/w and greater.

Figure 2:
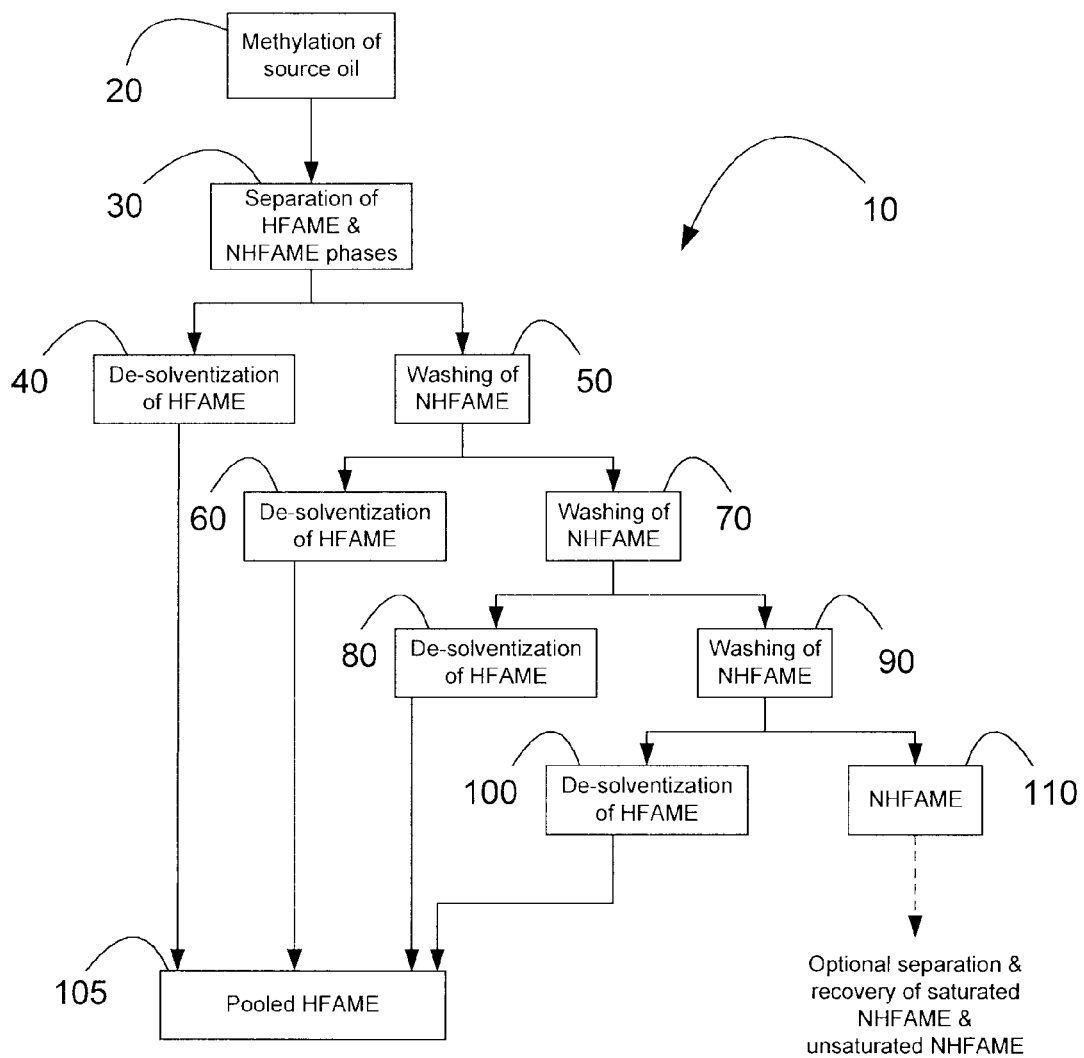
FIG. 2 is a schematic flowchart showing another exemplary process of the present invention for separation and recovery of hydroxy fatty acids from a source oil.

Certain exemplary embodiments of the present invention relate to processes for concentrating and/or purifying HFAME from source oils comprising HFA (FIGS. 1 and 2). A selected source oil is methylated 20 by intermixing with KOH/methanol mixture to obtain FAME. FAME are then mixed with 80% methanol and a non-polar solvent exemplified by methylpentane/hexane. The resulting mixture 30 is allowed to separate into a NHFAME-containing upper phase and a HFAME-containing lower phase. HFAME are recovered by desolventization of the lower phase 40. The upper NHFAME phase is washed with a $C_{1-3}$ alcohol exemplified by 80% methanol 50 and then allowed to separate into a second NHFAME-containing upper phase and a second HFAME-containing lower phase. Additional HFAME are recovered by desolventization of the second lower phase 60. The second upper NHFAME phase is extracted a third time with 80% methanol 70 and then allowed to separate into a third NHFAME-containing upper phase and a third HFAME-containing lower phase. Additional HFAME are recovered by desolventization of the third lower phase 80. The recovered HFAME from each extraction can be pooled 85. The enriched HFAME contains ricinoleic acid and/or densipolic acid and/or lesquerolic acid and/or auricolic acid and the like. It is optional to continue washing the third NHFAME-containing upper phase 90 if necessary to separate additional HFAME that can subsequently be recovered by desolventization 100 and pooling 105 with the HFAME previously recovered by the process shown in FIG. 2.

Figure 3:
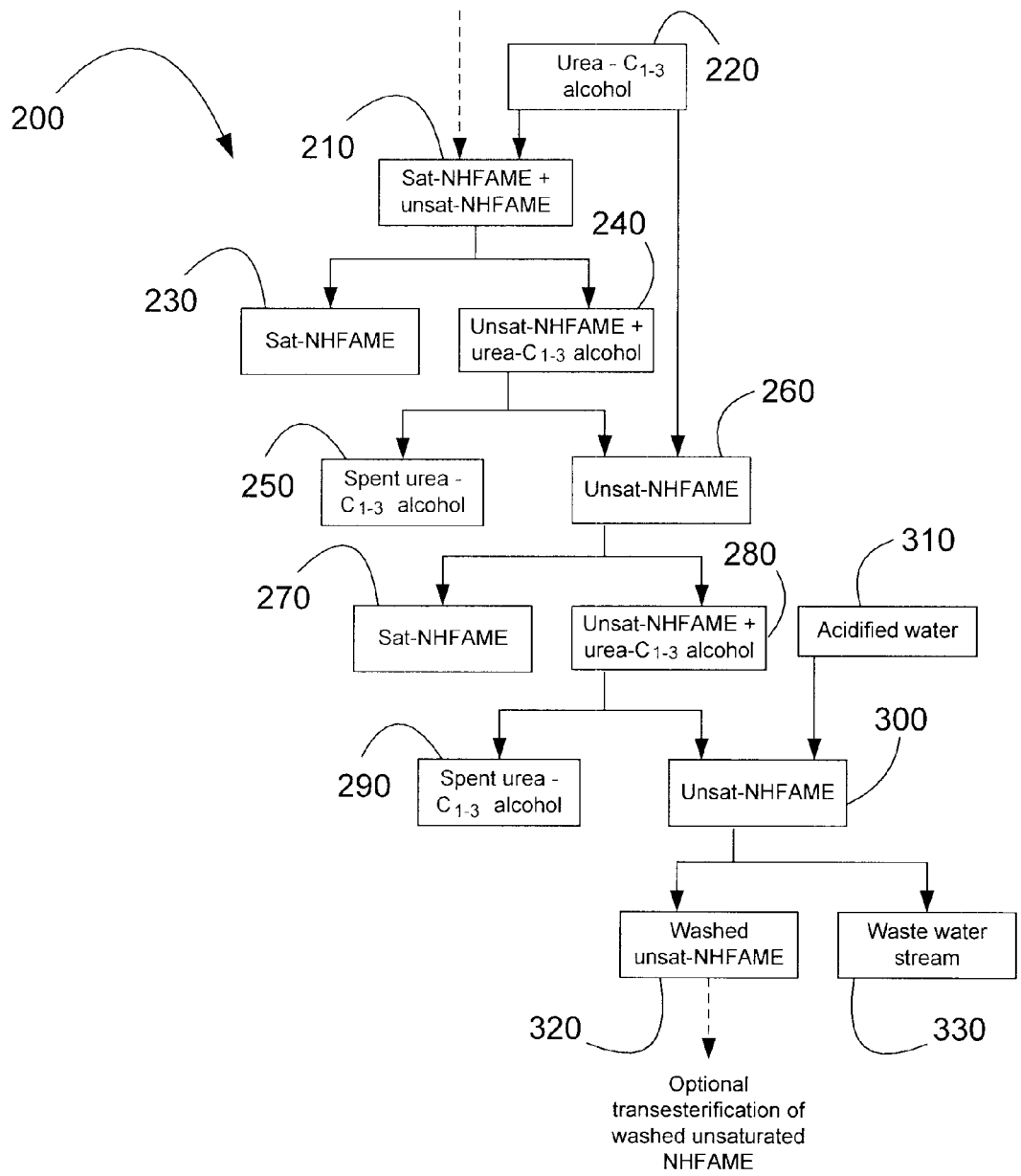
FIG. 3 is a schematic flowchart showing an exemplary process for separating non-hydroxy fatty acid methyl esters into saturated non-hydroxy fatty acid methyl esters and unsaturated non-hydroxy fatty acid methyl esters.

The washed NHFAME-containing phases 90, 110 comprise a blend of saturated NHFAME and unsaturated NHFAME. If so desired, the saturated NHFAME and unsaturated NHFAME can be separated and recovered from the NHFAME phases by a process 200 comprising complexation with a urea-organic solvent mixture 220 to create a saturated NHFAME enriched solids fraction and an unsaturated NHFAME enriched liquid fraction 210 (FIG. 3). The solvent of choice for use in this step of the process is a $C_{1-3}$ alcohol with or without water at a weight ratio of at least about 2:1 solvent to urea, preferably about 3:1 to 10:1, most preferably about 4:1 to 5:1. Urea should be employed at a weight ratio of at least 1:1 urea to fatty acid, preferably at a weight ratio of about 2:1 to 5:1, most preferably about 3:1. A weight ratio of less than about 1:1 tends to result in incomplete complexation of the fatty acids while a weight ratio in excess of about 5:1 increases processing cost without a concomitant increase in yield or separation efficiency.

Separation of the enriched saturated fatty acid-enriched NHFAME solids fraction 230 and unsaturated fatty acid-enriched NHFAME liquid fraction 240 from the blend 210 can be achieved by any of the well-known solid-liquid separation techniques. Suitable processes and systems include specifically, but not exclusively, decantation, countercurrent decantation, gravity sedimentation, filtration, expression, centrifugation and combinations thereof. The spent urea-solvent solution 250 is recovered from the unsaturated-NHFAME enriched liquid fraction 240 after which the unsaturated-NHFAME can be intermixed with fresh urea-organic solvent mixture 220 to further precipitate saturated fatty acid-enriched solids which can then be recovered 250 from the remaining unsaturated NHFAME enriched liquid fraction 260. The spent urea-solvent solution 290 is recovered from the unsaturated-NHFAME enriched liquid fraction 280 after which the unsaturated-NHFAME 300 are washed with water acidified to a pH of about 3-4 310. After separation of the waste water stream 330, the purified unsaturated NHFAME 320 can be used to produce if so desired, a cold-tolerant biodiesel fuel.

The following examples are provided to more fully describe the invention and are presented for non-limiting illustrative purposes.

EXAMPLES

Example 1

Purification of HFAME Using Castor Oil as the Source Oil

Castor oil was dried under vacuum for 30 min at 100° C. and then cooled to 60° C. Dried KOH (2% w/w of oil weight) was dissolved in methanol (20% w/w of oil weight) in a beaker. Once the oil was cooled to 60° C., the KOH/methanol mixture was added to the oil. The mixture was mixed in the rotary evaporator for 4 h. Then, the mixture was transferred into a separatory funnel for phase separation. The top layer comprised castor oil methyl esters. The bottom layer was recovered and suitably discarded. The top layer was transferred to a beaker and heated to 60° C. under nitrogen after which, a soap analysis was then done on the heated top layer. Then, Trysil S615 was added to the heated top layer (1% w/w Trysil S615 per 1000 ppm of soap) followed by mixing for 15 min before filtering to recover and separate the residual soap from the castor oil methyl esters. The castor oil methyl ester fraction, comprising HFAME and NHFAME, was then dried under vacuum and stored for subsequent use as the starting material in an exemplary embodiment of the HFAME purification process of the present invention.

Separation and purification of HFAME from castor oil methyl ester fraction was carried out as follows. In a reparatory funnel, 10 g castor oil methyl esters were mixed with a mixture containing 200 g of 80% methanol and 50 g of methylpentane/hexane mixture to obtain a ratio of 1:20:5 (w/w/w; methyl esters: 80% methanol: methylpentane/hexane). The mixture was shaken vigorously for 30 s and then allowed to separate into two layers. NHFAME separated into the top layer while the HFAME separated into the bottom layer. The layers were separated and desolventized to obtain enriched NHFAME and HFAME fractions. Ten μL of each fraction were diluted with 4 mL hexane and individually passed through a gas chromatograph (Agilent model 6890N) equipped with a DB-23 column (0.25 mm×30 M, 0.25 μm thick) and a flame ionization detector. The fatty acid composition (FAC) of castor oil, enriched HFAME and NHFAME are listed in Table 1.

TABLE 1

Fatty acid compositions of castor oil methyl esters, HFAME and NHFAME.

| FAME | Castor oil ME | HFAME | NHFAME |
|---|---|---|---|
| 16:0 | 1.37 | — | 2.44 |
| 18:0 | 1.46 | — | 2.70 |
| 18:1-9 | 3.73 | 0.20 | 6.72 |
| 18:1-11 | 0.60 | — | 1.11 |
| 18:2 | 5.15 | 0.44 | 9.39 |
| 18:3 | 0.57 | — | 0.86 |
| 20:0 | 0.11 | — | 0.19 |
| 20:1-11 | 0.45 | — | 0.66 |
| 18:1-OH | 86.18 | 99.37 | 75.13 |
| Total HFA | 86.18 | 99.37 | 75.13 |
| Total FAME | 99.61 | 100.00 | 99.19 |

These data show that the process increased the HFAME concentration in the recovered and enriched fraction from 86.18% to 99.37%.

Example 2

Purification of HFA ME from Oil Crushed from Genetically Engineered Soy Plants An exemplary process used for recovering, purifying and enriching HFA from soy oil is illustrated in FIG. 1. Seeds were harvested from genetically engineered soybean plants that were provided with a castor bean oleate hydroxylase gene sequence coding for a non-native HFA, using the pMS737.4 vector. As a consequence of the introduced oleate hydroxylase gene sequence, the genetically modified soybean plants produced ricinoleic acid (i.e. a non-native HFA in soy). The seeds were crushed to produce soybean oil comprising the non-native HFA (i.e., HF-soy oil). The HF-soy oil was dried under vacuum for 30 min at 100° C. and then cooled to 60° C. Dried KOH (2% w/w of oil weight) was dissolved in methanol (20% w/w of oil weight) in a beaker. Once the oil was cooled to 60° C., the KOH/methanol mixture was added to the oil. The mixture was mixed in the rotary evaporator for 4 h. Then, the mixture was transferred into a reparatory funnel for phase separation. The top layer comprised soy oil methyl esters. The bottom layer was recovered and suitably discarded. The top layer was transferred to a beaker and heated to 60° C. under nitrogen after which, a soap analysis was then done on the heated top layer. Then, Trysil S615 was added to the heated top layer (1% w/w Trysil S615 per 1000 ppm of soap) followed by mixing for 15 min before filtering to recover and separate the residual soap from the soy oil methyl esters. The soy oil methyl ester fraction, comprising a blend of HFAME and NHFAME, was then dried under vacuum and stored for subsequent use as the starting material in an exemplary embodiment of the HFAME purification process of the present invention.

The soy oil methyl ester fraction comprising the blend of HFAME and NHFAME, was mixed together with 80% methanol and 100% hexane/methylpentane in the ratio of 1:5:5 (w/w/w). This first mixture was stirred for about 1-2 h at ambient room temperature under nitrogen. The first mixture was then transferred to a separatory funnel and allowed to rest for a period of time to allow phase separation to occur (referred to as the first extraction). The first bottom phase comprising the HFAME and methanol was recovered from the separatory funnel and then desolventized by rotary evaporation. The first top phase comprising the NHFAME and hexane/methylpentane was recovered and then mixed together with 80% methanol and 100% hexane/methypentane in the ratio of 1:5:5 (w/w/w). This second mixture was stirred for about 1-2 h at ambient room temperature under nitrogen. The second mixture was then transferred to a separatory funnel and allowed to rest for a period of time to allow phase separation to occur (referred to as the second extraction). The second bottom phase comprising the HFAME and methanol was recovered from the separatory funnel and then desolventized by rotary evaporation. The second top phase comprising NHFAME was recovered and then mixed together with 80% methanol and 100% methylpentane/hexane in the ratio of 1:5:10 (w/w/w). This third mixture was stirred for about 1-2 h at ambient room temperature under nitrogen. The third mixture was then transferred to a separatory funnel and allowed to rest for a period of time to allow phase separation to occur (referred to as the third extraction). The third bottom phase comprising HFAME and methanol was recovered from the separatory funnel and then desolventized by rotary evaporation. The third top phase comprising NHFAME was recovered and then desolventized by rotary evaporation. The desolventized NHFAME were suitable for further processing to produce cold-tolerant biodiesel and/or lubricants. The fatty acid composition of HFAME from each of the extractions and of the NHFAME were analyzed and quantified by diluting a 10 µL aliquot of each extraction with 4 mL hexane and then passing it through a gas chromatograph (Agilent model 6890N) equipped with a DB-23 column (0.25 mm×30 M, 0.25 µm thick) and a flame ionization detector. The data showing the fatty acid compositions of HF-soy oil, purified HFAME and NHFAME fractions are listed in Table 2.

TABLE 2

Fatty acid compositions of HF-soy oil, HFAME and NHFAME fractions

| FAME | HF-soy oil % (w/w) | HFAME-1* % (w/w) | HFAME-2** % (w/w) | HFAME-3*** % (w/w) | NHFAME % (w/w) |
|---|---|---|---|---|---|
| 16:0 | 8.27 | 1.77 | 2.13 | 1.82 | 8.56 |
| 18:0 | 4.55 | 0.45 | 0.58 | 0.50 | 4.75 |
| 18:1-9 | 31.76 | 5.86 | 7.29 | 6.29 | 33.06 |
| 18:1-11 | 1.55 | — | — | — | 1.62 |
| 18:2 | 42.37 | 13.18 | 15.96 | 14.22 | 43.74 |
| 18:3 | 4.48 | 2.19 | 2.63 | 2.40 | 4.57 |
| 20:0 | 0.44 | 0.43 | — | — | 0.47 |
| 20:1-11 | 0.30 | — | — | — | 0.31 |
| 18:1-OH | 5.40 | 65.82 | 61.93 | 65.50 | 2.47 |
| 18:2-OH | 0.44 | 7.47 | 6.23 | 6.11 | 2.47 |
| Total HFAME | 5.84 | 73.29 | 68.15 | 71.61 | 2.47 |
| Total FAME | 99.56 | 97.17 | 96.74 | 96.85 | 99.54 |
| % yield (w/w) | | 2.83 | 2.35 | 1.15 | 93.42 |

*1$^{st}$ extraction
**2$^{nd}$ extraction
***3$^{rd}$ extraction

The data show that although the total HFAME content of HF-soy oil was less than 6% (w/w), in each of the three washings and extractions of methylated HF-soy oil fatty acids with a solvent mixture of methanol and hexane, the % HFAME content in the recovered and enriched product was over 68%, while the total yield of NHFAME was 93.42% (w/w).

Examples 3-5

Enrichment of HFAME Using Model Systems as Source Oils

Plant systems may be genetically engineered to enable their production of C18:1-OH from C18:1-9. In addition, C18:2 may also be derived from C18:1-9. It is likely that the synthesis and production of these three fatty acids is interelated, and may also vary considerably in different types of plants. Furthermore, the polarities of C18:1-9 and C18:2 may be similar to C18:1-OH and thereby, affect separation and recovery of C18:1-OH from source oils. Therefore, model systems comprising different mixtures (i.e., formulae) of C18:1, C18:2 and C18:1-OH were prepared and used to assess the efficiencies of exemplary embodiments of the present process for separation, recovery, purification and enrichment of C18:1-OH.

Example 3

Five model mixtures of fatty acid methyl esters were prepared to assess the effects of variable linoleic acid (C18:2) and hydroxylated oleic acid (C18:1-OH) levels on the separation and purification of C18:1-OH with an exemplary process of the present invention. The model mixtures comprised methyl esters of palmitic acid (C16:0), stearic acid (C18:0), oleic acid (C18:1-9; C18:1-11), linoleic acid (C18:2), linolenic acid (C18:3), arachidic acid (C20:0), eicosenoic acid (C20:1-11), and ricinoleic acid (C18:1-OH). Methyl esters of palmitic acid, stearic acid, oleic acid, linoleic acid, linolenic acid, arachidic acid, and eicosenoic acid were purchased from Nu-Chek Prep Inc. (Elysian, Minn., US). Ricinoleic acid methyl ester was separated and recovered from castor oil following the process described in Example 1. The purity and concentration of the resulting C18:1-OH HFAME were determined by GC analysis. Twenty-gram quantities of each formula were prepared and stored in a freezer until required. The five model mixtures i.e. formulae 1-5 were prepared for this study as shown in Table 3. For this study, the oleic acid content of each formula was constant while the levels of linoleic acid and ricinoleic acid were varied.

TABLE 3

| FAME (g) | Formula 1 | Formula 2 | Formula 3 | Formula 4 | Formula 5 |
|---|---|---|---|---|---|
| C16:0 | 1.71 | 1.71 | 1.71 | 1.71 | 1.71 |
| C18:0 | 0.90 | 0.90 | 0.91 | 0.91 | 0.92 |
| C18:1-9 | 6.41 | 6.42 | 6.43 | 6.41 | 6.42 |
| C18:1-11 | 0.34 | 0.33 | 0.36 | 0.33 | 0.32 |
| C18:2 | 8.60 | 8.21 | 7.60 | 7.21 | 6.61 |
| C18:3 | 0.95 | 1.06 | 0.97 | 0.92 | 0.94 |
| C20:0 | 0.10 | 0.10 | 0.10 | 0.11 | 0.10 |
| C20:1-11 | 0.07 | 0.07 | 0.06 | 0.07 | 0.06 |
| C18:1-OH | 1.01 | 1.41 | 2.02 | 2.42 | 3.01 |
| Total FAME | 20.10 | 20.21 | 20.16 | 20.09 | 20.10 |

The HFAME and NHFAME components of each formula were fractionated as follows. Approximately 10 g of model FAME were mixed with 80% methanol and hexane/methylpentane at a ratio of 1:5:5 (w/w/w) in a separatory funnel. The mixture was shaken vigorously for 30 s. The mixture was then allowed to separate into two clear layers before each phase was recovered and desolventized. Two fractionations (replicates) were carried out and each fractionation was done with 10 g of sample. The fatty acid compositions in the samples were analyzed using GC as described in the previous examples. The weight yields of HFAME were determined gravimetrically and the percentage yields were calculated. The study was repeated a second time, the data were averaged and are shown in Table 4.

TABLE 4

Effects of linoleic acid on recovery and enrichment of HFA.

| FAME | Formula 1 (43/4) | | Formula 2 (41/5) | | Formula 3 (38/8) | | Formula 4 (37/9) | | Formula 5 (34/12) | |
|---|---|---|---|---|---|---|---|---|---|---|
| | % in model mixture | HFAME % | % in model mixture | HFAME % | % in model mixture | HFAME % | % in model mixture | HFAME % | % in model mixture | HFAME % |
| 16:0 | 8.44 | 2.16 | 8.46 | 1.89 | 8.52 | 1.45 | 8.59 | 1.55 | 8.63 | 1.27 |
| 18:0 | 4.65 | 0.53 | 4.65 | 0.49 | 4.73 | 0.38 | 4.73 | 0.45 | 4.85 | 0.34 |
| 18:1-9 | 31.96 | 7.13 | 31.99 | 6.33 | 32.32 | 4.84 | 32.43 | 5.20 | 32.65 | 4.18 |
| 18:1-11 | 1.71 | 0.38 | 1.68 | 0.33 | 1.80 | 0.27 | 1.73 | 0.27 | 1.68 | 0.23 |
| 18:2 | 43.08 | 16.59 | 41.05 | 13.71 | 38.41 | 9.72 | 36.77 | 9.43 | 33.90 | 7.22 |
| 18:3 | 4.93 | 3.06 | 5.46 | 2.90 | 5.04 | 2.03 | 4.86 | 1.90 | 4.95 | 1.64 |
| 20:0 | 0.53 | — | 0.53 | — | 0.53 | — | 0.57 | — | 0.56 | — |
| 20:1-11 | 0.38 | — | 0.33 | — | 0.33 | — | 0.35 | — | 0.33 | — |
| 18:1-OH | 3.82 | 70.14 | 5.36 | 74.36 | 7.80 | 81.22 | 9.45 | 81.20 | 11.94 | 84.75 |
| % Yield | | 1.9 | | 2.54 | | 3.28 | | 4.05 | | 4.78 |

The data in Table 4 show that when C18:1-OH was present in the model oil mixture at a very low level i.e., 3.82% of the total FAC, the process recovered and enriched a fraction that comprised over 70% (Formula 1). As the C18:1-OH concentration was successively increased from 3.82% in the Formula 1 mixture to 11.94% in the Formula 5 mixture, the concentration of C18:1-OH in their corresponding HFAME fractions increased from 70.14% to 84.75%, thereby demonstrating the separation, recovery and enrichment of HFA from various source oils by this process.

Example 4

Five model mixtures of fatty acid methyl esters were prepared to assess the effects of variable oleic acid (C18:1) and ricinoleic acid (C18:1-OH) levels on the separation and purification of hydroxy fatty acids with an exemplary process of the present invention. The model mixtures comprised methyl esters of palmitic acid (C16:0), stearic acid (C18:0), oleic acid (C18:1-9; C18:1-11), linoleic acid (C18:2), linolenic acid (C18:3), arachidic acid (C20:0), eicosenoic acid (C20:1-11), and ricinoleic acid (C18:1-OH). Methyl esters of palmitic acid, stearic acid, oleic acid, linoleic acid, linolenic acid, arachidic acid, and eicosenoic acid were purchased from Nu-Chek Prep Inc. (Elysian, Minn., US). Ricinoleic acid methyl ester was separated and recovered from castor oil following the process described in Example 1. The purity and concentration of the resulting C18:1-OH HFAME were determined by GC analysis. Twenty-gram quantities of each formula were prepared and stored in a freezer until required. The five model mixtures i.e. formulae 6-10 were prepared for this study as shown in Table 5. For this study, the linoleic acid content of each formula was constant while the levels of oleic acid and ricinoleic acid were varied.

The HFAME and NHFAME components of each formula were fractionated, enriched and analyzed as described in Example 3. The weight yields of HFAME were determined gravimetrically and the percentage yields were calculated. The study was repeated a second time, the data were averaged and are shown in Table 6.

TABLE 5

| FAME (g) | Formula 6 | Formula 7 | Formula 8 | Formula 9 | Formula 10 |
|---|---|---|---|---|---|
| C16:0 | 1.71 | 1.71 | 1.74 | 1.71 | 1.71 |
| C18:0 | 0.90 | 0.91 | 0.91 | 0.91 | 0.91 |
| C18:1-9 | 6.41 | 6.01 | 5.42 | 5.02 | 4.41 |
| C18:1-11 | 0.34 | 0.33 | 0.32 | 0.35 | 0.34 |
| C18:2 | 8.60 | 8.61 | 8.63 | 8.61 | 8.61 |
| C18:3 | 0.95 | 0.92 | 0.92 | 0.93 | 1.01 |
| C20:0 | 0.10 | 0.11 | 0.11 | 0.10 | 0.11 |
| C20:1-11 | 0.07 | 0.072 | 0.06 | 0.06 | 0.06 |
| C18:1-OH | 1.01 | 1.41 | 2.00 | 2.41 | 3.02 |
| Total FAME | 20.10 | 20.07 | 20.12 | 20.09 | 20.17 |

TABLE 6

Effects of oleic acid on recovery and enrichment of HFA.

| FAME | Formula 6 (32/4) | | Formula 7 (30/5) | | Formula 8 (28/7) | | Formula 9 (25/10) | | Formula 10 (22/13) | |
|---|---|---|---|---|---|---|---|---|---|---|
| | % in model mixture | HFAME % | % in model mixture | HFAME % | % in model mixture | HFAME % | % in model mixture | HFAME % | % in model mixture | HFAME % |
| 16:0 | 8.44 | 2.16 | 8.77 | 2.08 | 8.49 | 2.46 | 8.24 | 1.33 | 8.29 | 1.62 |
| 18:0 | 4.65 | 0.53 | 4.74 | 0.62 | 4.81 | 0.96 | 4.80 | 0.42 | 4.76 | 0.67 |
| 18:1-9 | 31.96 | 7.13 | 30.42 | 6.86 | 27.56 | 7.18 | 25.42 | 3.74 | 22.38 | 4.20 |
| 18:1-11 | 1.71 | 0.38 | 1.68 | 0.37 | 1.66 | 0.42 | 1.78 | 0.26 | 1.73 | 0.32 |
| 18:2 | 43.08 | 16.59 | 43.57 | 15.94 | 43.80 | 15.62 | 43.62 | 10.26 | 43.68 | 11.28 |
| 18:3 | 4.93 | 3.06 | 4.78 | 2.71 | 4.82 | 2.36 | 4.85 | 1.76 | 5.27 | 1.89 |
| 20:0 | 0.53 | — | 0.54 | — | 0.58 | — | 0.57 | — | 0.60 | — |
| 20:1-11 | 0.38 | — | 0.35 | — | 0.34 | — | 0.31 | — | 0.32 | — |
| 18:1-OH | 3.82 | 70.14 | 4.57 | 71.42 | 7.36 | 71.00 | 10.02 | 82.23 | 12.63 | 79.94 |
| % Yield | | 1.90 | | 2.63 | | 3.78 | | 3.94 | | 4.96 |

The data in Table 6 show that when C18:1-OH was present in the model oil mixture at a very low level i.e., 3.82% of the total FAC, the process recovered and enriched a fraction that comprised over 70% (Formula 6). As the C18:1-OH concentration was successively increased from 3.82% in the Formula 6 mixture to 12.63% in the Formula 10 mixture, the concentration of C18:1-OH in their corresponding HFAME fractions increased from 70.14% to 79.94%, thereby demonstrating the separation, recovery and enrichment of HFA from various source oils by this process.

Example 5

Five model mixtures of fatty acid methyl esters were prepared to assess the effects of variable linoleic acid (C18:2) and oleic acid (C18:1) levels on the separation and purification of hydroxy fatty acids with an exemplary process of the present invention. The model mixtures comprised methyl esters of palmitic acid (C16:0), stearic acid (C18:0), oleic acid (C18:1-9; C18:1-11), linoleic acid (C18:2), linolenic acid (C18:3), arachidic acid (C20:0), eicosenoic acid (C20:1-11), and ricinoleic acid (C18:1-OH). Methyl esters of palmitic acid, stearic acid, oleic acid, linoleic acid, linolenic acid, arachidic acid, and eicosenoic acid were purchased from Nu-Chek Prep Inc. (Elysian, Minn., US). Ricinoleic acid methy ester was separated and recovered from castor oil following the process described in Example 1. The purity and concentration of the resulting C18:1-OH HFAME were determined by GC analysis. Twenty-gram quantities of each formula were prepared and stored in a freezer until required. The five model mixtures i.e. formulae 11-15 were prepared for this study as shown in Table 7. For this study, the levels of oleic acid and linoleic acid were varied, while the levels of hydroxylated oleic acid were constant across the five formulae.

The HFAME and NHFAME components of each formula were fractionated, enriched and analyzed as described in Example 3. The weight yields of HFAME were determined gravimetrically and the percentage yields were calculated. The study was repeated a second time, the data were averaged and are shown in Table 8.

TABLE 7

| FAME (g) | Formula 11 | Formula 12 | Formula 13 | Formula 14 | Formula 15 |
| --- | --- | --- | --- | --- | --- |
| C16:0 | 1.71 | 1.71 | 1.70 | 1.70 | 1.70 |
| C18:0 | 0.90 | 0.91 | 0.90 | 0.91 | 0.91 |
| C18:1-9 | 6.42 | 6.01 | 5.42 | 5.00 | 4.41 |
| C18:1-11 | 0.33 | 0.33 | 0.32 | 0.32 | 0.49 |
| C18:2 | 8.21 | 8.61 | 9.22 | 9.60 | 10.21 |
| C18:3 | 1.06 | 0.92 | 0.93 | 0.93 | 0.93 |
| C20:0 | 0.10 | 0.11 | 0.10 | 0.10 | 0.10 |
| C20:1-11 | 0.07 | 0.07 | 0.07 | 0.06 | 0.06 |
| C18:1-OH | 1.41 | 1.41 | 1.41 | 1.41 | 1.41 |
| Total FAME | 20.21 | 20.07 | 20.08 | 20.03 | 20.22 |

TABLE 8

Effects of linoleic acid and oleic acid on recovery and enrichment of HFA.

| | Formula 11 (41/32) | | Formula 12 (44/30) | | Formula 13 (46/27) | | Formula 14 (48/25) | | Formula 15 (51/22) | |
| --- | --- | --- | --- | --- | --- | --- | --- | --- | --- | --- |
| FAME | % in model mixture | HFAME % | % in model mixture | HFAME % | % in model mixture | HFAME % | % in model mixture | HFAME % | % in model mixture | HFAME % |
| 16:0 | 8.46 | 1.89 | 8.77 | 2.08 | 8.07 | 2.35 | 8.19 | 2.37 | 8.15 | 2.52 |
| 18:0 | 4.65 | 0.49 | 4.74 | 0.62 | 4.72 | 0.84 | 4.75 | 0.93 | 4.71 | 0.95 |
| 18:1-9 | 31.99 | 6.33 | 30.42 | 6.86 | 27.20 | 7.19 | 25.25 | 6.93 | 22.05 | 6.29 |
| 18:1-11 | 1.68 | 0.33 | 1.68 | 0.37 | 1.66 | 0.43 | 1.66 | 0.45 | 2.48 | 0.70 |
| 18:2 | 41.05 | 13.71 | 43.57 | 15.94 | 46.39 | 18.24 | 48.31 | 19.01 | 50.91 | 20.79 |
| 18:3 | 5.46 | 2.90 | 4.78 | 2.71 | 4.84 | 2.80 | 4.82 | 2.73 | 4.79 | 2.80 |
| 20:0 | 0.53 | — | 0.54 | — | 0.56 | — | 0.56 | — | 0.55 | — |
| 20:1-11 | 0.33 | — | 0.35 | — | 0.35 | — | 0.32 | — | 0.32 | — |
| 18:1-OH | 5.36 | 74.36 | 4.57 | 71.42 | 5.80 | 68.10 | 5.76 | 67.58 | 5.70 | 65.94 |
| % Yield | | 2.54 | | 2.63 | | 2.81 | | 2.63 | | 2.81 |

The data in Table 8 show that when C18:1-OH was present in the model oil mixture at a very low level i.e., 5.36% of the total FAC, the process recovered and enriched a fraction that comprised over 70% (Formula 11). Increasing the C18:2 concentration and decreasing the C18:1 concentration while keeping the C18:1-OH concentration constant resulted in declines in the amounts of C18:1-OH recovered. However, even in Formula 15, the recovered and purified HFA fraction comprised over 65% C18:1-OH thereby demonstrating the separation, recovery and enrichment of HFA from various source oils by this process.

Example 6

Purification of HFAME from *Lesquerella* Oil

An exemplary process used for recovering, purifying and enriching HFAME from *lesquerella* oil is illustrated in FIG. 2. The *lesquerella* oil was dried under vacuum for 30 min at 100° C. and then cooled to 60° C. Dried KOH (1-2% w/w of oil weight) was dissolved in methanol (20% w/w of oil weight) in a beaker. Once the oil was cooled to 60° C., the KOH/methanol mixture was added to the oil. The mixture was mixed in the rotary evaporator for 4 h. Then, the mixture was transferred into a separatory funnel for phase separation. The top layer comprised *lesquerella* oil methyl esters. The bottom layer was recovered and suitably discarded. The top layer was transferred to a beaker and heated to 60° C. under nitrogen after which, a soap analysis was then done on the heated top layer. Then, Trysil 300 was added to the heated top layer (1% w/w Trysil 300 per 1000 ppm of soap) followed by mixing for 15 min before filtering to recover and separate the residual soap from the *lesquerella* oil methyl esters. The *lesquerella* oil methyl ester fraction, comprising a blend of HFAME and NHFAME, was then dried under vacuum and stored for subsequent use as the starting material in an exemplary embodiment of the HFAME purification process of the present invention.

The *lesquerella* oil methyl ester fraction comprising the blend of HFAME and NHFAME was mixed together with methanol (80%-90% methanol with remaining being water) and 100% hexane/methylpentane in the ratio of 1:5:5 (w/w/w). This first mixture was stirred for about 1-2 h at ambient room temperature under nitrogen. The first mixture was then transferred to a separatory funnel and allowed to rest for a period of time to allow phase separation to occur (referred to as the first extraction). The first bottom phase comprising the HFAME and methanol was recovered from the separatory funnel and then desolventized by rotary evaporation. The first top phase comprising the NHFAME and hexane/methylpentane was recovered and then mixed together with methanol (80%-90% methanol with remaining being water) and 100% hexane in the ratio of 1:5:5 (w/w/w). This second mixture was stirred for about 1-2 h at ambient room temperature under nitrogen. The second mixture was then transferred to a separatory funnel and allowed to rest for a period of time to allow phase separation to occur (referred to as the second extraction). The second bottom phase comprising the HFAME and methanol was recovered from the separatory funnel and then desolventized by rotary evaporation. The second top phase comprising NHFAME was recovered and then mixed together with methanol (80%-90% methanol with remaining being water) and 100% methylpentane/hexane in the ratio of 1:5:10 (w/w/w). This third mixture was stirred for about 1-2 h at ambient room temperature under nitrogen. The third mixture was then transferred to a separatory funnel and allowed to rest for a period of time to allow phase separation to occur (referred to as the third extraction). The third bottom phase comprising HFAME and methanol was recovered from the separatory funnel and then desolventized by rotary evaporation. The third top phase comprising NHFAME was recovered and then mixed together with methanol (80%-90% methanol with remaining being water) and 100% methylpentane/hexane in the ratio of 1:5:10 (w/w/w). This fourth mixture was stirred for about 1-2 h at ambient room temperature under nitrogen. The fourth mixture was the transferred to a separatory funnel and allowed to rest for a period of time to allow phase separation to occur (referred to as the fourth extraction). The fourth bottom phase comprising HFAME and methanol was recovered from the separatory funnel and then desolventized by rotary evaporation. The fourth top phase comprising NHFAME was recovered and then desolventized by rotary evaporation. The desolventized NHFAME were suitable for further processing to produce cold-tolerant biodiesel and/or lubricants. The fatty acid composition of HFAME from each of the extractions and of the NHFAME were analyzed and quantified by diluting a 10 μL aliquot of each extraction with 4 mL hexane and then passing it through a gas chromatograph (Agilent model 6890N) equipped with a DB-23 column (0.25 mm×30 M, 0.25 μm thick) and a flame ionization detector. The data showing the fatty acid compositions of *lesquerella* oil, purified HFAME and NHFAME fractions are listed in Table 9 (fractionation using 80% methanol) and Table 10 (fractionation using 90% methanol).

TABLE 9

Fatty acid compositions of lesquerella oil, HFAME and NHFAME fractions resulted from fractionation using 80% methanol).

| FAME | Lesquerella oil % area | HFAME-1[a] % area | HFAME-2[b] % area | HFAME-3[c] % area | HFAME-4[d] % area | NHFAME % area |
|---|---|---|---|---|---|---|
| 16:0 | 1.29 | | 0.13 | | 0.05 | 1.49 |
| 16:1 | 1.00 | | 0.15 | | 0.06 | 0.98 |
| 18:0 | 1.89 | | | | | 2.40 |
| 18:1-9 | 13.42 | 1.28 | 1.33 | 0.96 | 1.09 | 17.26 |
| 18:1-11 | 2.02 | 0.19 | 0.20 | | 0.16 | 2.39 |
| 18:2 | 7.45 | 1.07 | 1.14 | 0.86 | 0.95 | 9.29 |
| 18:3 | 12.50 | 2.72 | 2.92 | 2.26 | 2.45 | 15.49 |
| 20:0 | 0.17 | | | | | 0.22 |
| 20:1-11 | 0.89 | | | | | 1.16 |
| 18:1-OH | 0.54 | 1.49 | 1.32 | 1.29 | 1.16 | 0.35 |
| 20:1-OH | 55.94 | 86.43 | 86.81 | 88.36 | 87.96 | 46.80 |
| 20:2-OH | 2.90 | 6.63 | 6.24 | 6.27 | 6.01 | 2.16 |
| Total HFAME | 59.38 | 94.54 | 94.37 | 95.93 | 95.13 | 49.32 |
| Total FAME | 100.01 | 99.81 | 100.24 | 100 | 99.89 | 99.99 |
| % yield (w/w) | | 6.83 | 6.95 | 4.26 | 4.50 | 77.55 |

[a] 1st extraction
[b] 2nd extraction
[c] 3rd extraction
[d] 4th extraction

The data show that total HFAME contents of all four HFAME fractions are above 94% when fractionation is carried out using 80% methanol. After four successive fractionations, 36% of HFAME was recovered from the original *lesquerella* oil. By combining the four HFAME fractions, we can obtain a HFAME fraction containing 95% total HFAME with a yield of 22.54%.

TABLE 10

Fatty acid compositions of lesquerella oil, HFAME and NHFAME fractions resulted from fractionation using 90% methanol).

| FAME | Lesquerella oil % area | HFAME-1[a] % area | HFAME-2[b] % area | HFAME-3[c] % area | HFAME-4[d] % area | NHFAME % area |
|---|---|---|---|---|---|---|
| 16:0 | 1.29 | 0.25 | 0.38 | 0.35 | 0.47 | 2.49 |
| 16:1 | 1.00 | 0.23 | 0.35 | 0.33 | 0.45 | 1.54 |
| 18:0 | 1.89 | 0.26 | 0.41 | 0.36 | 0.49 | 4.23 |
| 18:1-9 | 13.42 | 2.67 | 4.17 | 3.82 | 5.19 | 29.16 |
| 18:1-11 | 2.02 | 0.37 | 0.58 | 0.54 | 0.73 | 4.02 |
| 18:2 | 7.45 | 1.96 | 3.00 | 2.86 | 3.88 | 14.84 |
| 18:3 | 12.50 | 4.39 | 6.49 | 6.40 | 8.61 | 23.13 |
| 20:0 | 0.17 | | | | | 0.40 |
| 20:1-11 | 0.89 | | 0.19 | 0.16 | 0.23 | 2.07 |
| 18:1-OH | 0.54 | 1.00 | 0.76 | 0.68 | 0.52 | 0.22 |
| 20:1-OH | 55.94 | 83.54 | 79.18 | 80.41 | 75.75 | 17.41 |
| 20:2-OH | 2.90 | 5.33 | 4.40 | 4.18 | 3.51 | 0.61 |
| Total HFAME | 59.38 | 89.88 | 84.34 | 85.27 | 79.77 | 18.13 |
| Total FAME | 100.01 | 100.00 | 99.91 | 100.09 | 99.83 | 100.12 |
| % yield (w/w) | | 25.77 | 21.17 | 7.34 | 5.58 | 40.14 |

[a] 1st extraction
[b] 2nd extraction
[c] 3rd extraction
[d] 4th extraction

The data show that total HFAME content of all four HFAME fractions are above 79% when fractionation is carried out using 90% methanol. After four successive fractionations, 87.02% of HFAME was recovered from the original *lesquerella* oil. By combining the four HFAME fractions, we can obtain a HFAME fraction containing 86% total HFAME with a yield of 59.86%.

HFAME fraction obtained from 90% methanol fractionation had lower HFAME concentration (86%) compared to the one obtained from 80% methanol fractionation (95%); however yield of HFAME fraction obtained from 90% methanol fractionation was higher (59.86%) than the one obtained from 80% methanol fractionation (22.54%). Depends on the HFAME concentration needed, different percentage methanol can be used in the fractionation.

Example 7

Purification of HFAME from Genetically Engineered Camelina Oil

The exemplary process used for recovering, purifying and enriching HFA from genetically engineered camelina oil is illustrated in FIG. 1. The seeds were pressed to produce camelina oil comprising the non-native HFA (i.e., HF-camelina oil). The pressed camelina cake was then extracted with methylpentane/hexane to obtain residue oil. The pressed and solvent extracted oil were combined to obtain crude HF-camelina oil. The crude HF-camelina oil was dried under vacuum for 30 min at 100° C. and then cooled to 60° C. Dried KOH (1-2% w/w of oil weight) was dissolved in anhydrous methanol (20% w/w of oil weight) in a beaker. Once the oil was cooled to 60° C., the KOH/methanol mixture was added to the oil. The mixture was mixed in the rotary evaporator for 4 h. Then, the mixture was transferred into a separatory funnel for phase separation. The top layer comprised camelina oil methyl esters. The bottom layer was recovered and suitably discarded. The top layer was transferred to a beaker and heated to 60° C. under nitrogen after which, a soap analysis was then done on the heated top layer. Then, Trysil 300 was added to the heated top layer (1% w/w Trysil 300 per 1000 ppm of soap) followed by mixing for 15 min before filtering to recover and separate the residual soap from the camelina oil methyl esters. The camelina oil methyl ester fraction, comprising a blend of HFAME and NHFAME, was then distillated at 220° C. under vacuum (0.1-0.2 mmHg). The distilled camelina methyl esters were water washed and stored for subsequent use as the starting material in an exemplary embodiment of the HFAME purification process of the present invention.

The camelina oil methyl ester fraction comprising the blend of HFAME and NHFAME, was mixed together with methanol (70-90% with the remaining being water) and 100% hexane/methylpentane in the ratio of 1:5:5 (w/w/w). This first mixture was stirred for about 1-2 h at ambient room temperature under nitrogen. The first mixture was then transferred to a separatory funnel and allowed to rest for a period of time to allow phase separation to occur (referred to as the first extraction). The first bottom phase comprising the HFAME and methanol was recovered from the separatory funnel and then desolventized by rotary evaporation. The first top phase comprising the NHFAME and hexane/methylpentane was recovered and then mixed together with methanol and 100% hexane in the ratio of 1:5:5 (w/w/w). This second mixture was stirred for about 1-2 h at ambient room temperature under nitrogen. The second mixture was then transferred to a separatory funnel and allowed to rest for a period of time to allow phase separation to occur (referred to as the second extraction). The second bottom phase comprising the HFAME and methanol was recovered from the separatory funnel and then desolventized by rotary evaporation. The second top phase comprising NHFAME was recovered and then mixed together with methanol and 100% methylpentane/hexane in the ratio of 1:5:10 (w/w/w). This third mixture was stirred for about 1-2 h at ambient room temperature under nitrogen. The third mixture was then transferred to a separatory funnel and allowed to rest for a period of time to allow phase separation to occur (referred to as the third extraction). The third bottom phase comprising HFAME and methanol was recovered from the separatory funnel and then desolventized by rotary evaporation. The third top phase comprising NHFAME was recovered and then desolventized by rotary evaporation. The desolventized NHFAME were suitable for further processing to produce cold-tolerant biodiesel and/or lubricants. The fatty acid composition of HFAME from each of the extractions and of the NHFAME were analyzed and quantified by diluting a 10 µL aliquot of each extraction with 4 mL hexane and then passing it through a gas chromatograph (Agilent model 6890N) equipped with a DB-23 column (0.25 mm×30 M, 0.25 µm thick) and a flame ionization detector. The data showing the fatty acid compositions of HF-camelina oil, purified HFAME and NHFAME fractions are listed in Table 11.

TABLE 11

Fatty acid compositions of HF-camelina oil, distilled camelina methyl esters, HFAME and NHFAME fractions resulted from 80% methanol fractionation.

| FAME | HF-camelina oil % area | distilled camelina methyl esters % area | HFAME-1[a] % area | HFAME-2[b] % area | HFAME-3[c] % area | NHFAME % area |
|---|---|---|---|---|---|---|
| 16:0 | 6.59 | 6.63 | 1.22 | 1.73 | 1.68 | 7.02 |
| 18:0 | 4.90 | 5.30 | 0.52 | 0.81 | 0.74 | 5.70 |
| 18:1-9 | 30.60 | 30.44 | 5.11 | 7.41 | 7.10 | 32.42 |
| 18:1-11 | 1.31 | 0.93 | 0.19 | 0.27 | 0.26 | 1.11 |
| 18:2 | 10.58 | 10.77 | 2.91 | 4.06 | 4.01 | 11.41 |
| 18:3 | 18.23 | 18.41 | 7.66 | 10.37 | 10.51 | 19.26 |
| 20:0 | 1.30 | 1.36 | 0.25 | 0.10 | 0.11 | 1.46 |
| 20:1-11 | 14.37 | 14.54 | 1.32 | 2.07 | 1.90 | 15.77 |
| 20:2 | 0.49 | 0.45 |  | 0.10 | 0.10 | 0.49 |
| 20:3 | 0.32 | 0.35 | 0.07 | 0.10 | 0.10 | 0.37 |
| 22:1 | 0.83 | 0.72 | 0.23 | 0.17 | 0.14 | 0.72 |
| 18:1-OH | 3.86 | 3.77 | 30.10 | 28.95 | 30.18 | 1.55 |
| 18:2-OH | 4.67 | 4.48 | 46.53 | 39.74 | 38.74 | 1.36 |
| 20:1-OH | 0.46 | 0.45 | 1.79 | 2.02 | 2.32 | 0.22 |
| 20:2-OH | 0.19 | 0.18 | 1.04 | 1.08 | 1.20 |  |
| Total HFAME | 9.18 | 8.88 | 79.46 | 71.79 | 72.44 | 3.13 |
| Total FAME | 98.70 | 98.78 | 98.94 | 98.98 | 99.09 | 98.86 |
| % yield (w/w) |  |  | 3.13 | 2.67 | 1.30 | 92.90 |

[a] 1st extraction
[b] 2nd extraction
[c] 3rd extraction

The data show that the total HFAME content of each of the three HFAME fraction was increased from 9.18% to greater than 70%. By combining the three fractions, a HFAME fraction was obtained with a yield of 7.1% and HFAME concentration of 75.29%.

While particular exemplary embodiments of the present invention have been described in the foregoing, it is to be understood that other embodiments are possible within the scope of the present invention and are intended to be included herein. In view of numerous changes and variations that will be apparent to persons skilled in the art, the scope of the present invention is to be considered limited solely by the appended claims.

We claim:

1. A process for recovering, purifying and enriching hydroxy fatty acids from a source oil, the process comprising:
   (a) methylating the source oil to form therein a mixture of hydroxy fatty acid methyl esters and non-hydroxy fatty acid methyl esters;
   (b) separating the hydroxy fatty acid methyl esters from the non-hydroxy fatty acid methyl esters with an organic solvent mixture comprising a short-chain alcohol and a pentane/hexane; and
   (c) separately recovering the hydroxy fatty acid methyl esters and the non-hydroxy fatty acid methyl esters.

2. The process of claim 1, wherein the short-chain alcohol is one of methanol, ethanol and propanol.

3. The process of claim 1, wherein the short-chain alcohol is methanol.

4. The process of claim 1, wherein the pentane/hexane is methylpentane/hexane.

5. The process of claim 1, wherein the recovered non-hydroxy fatty acid methyl esters are washed with a short-chain alcohol to separate therefrom additional hydroxyl fatty acid methyl esters, and separately recovering the washed non-hydroxy fatty acid methyl esters and the additional hydroxy fatty acid methyl esters.

6. The process of claim 5, wherein the short-chain alcohol is one of methanol, ethanol and propanol.

7. The process of claim 5, wherein the short-chain alcohol is methanol.

8. The process of claim 1, wherein the hydroxy fatty acid is one of ricinoleic acid, densipolic acid, lesquerolic acid, and auricolic acid.

9. The process of claim 1, wherein the source oil is derived from plant materials.

10. The process of claim 1, wherein the source oil is derived from one of castor bean plant materials, camelina plant materials, palm plant materials, legume plant materials, Lesquerella sp. plant materials, Brassica sp. plant materials, and Brassicacea sp. plant materials.

11. The process of claim 10, wherein the plant materials are derived from genetically modified plants.

12. The process of claim 1, wherein the non-hydroxy fatty acid methyl esters are comingled with an organic solvent comprising urea thereby creating mixture of: (i) saturated non-hydroxy fatty acid methyl esters complexed with urea and (ii) free unsaturated non-hydroxy fatty acid methyl esters, and separately recovering the saturated non-hydroxy fatty acid methyl esters complexed with urea and the free unsaturated non-hydroxy fatty acid methyl esters.

13. The process of claim 12, wherein the free unsaturated non-hydroxy fatty acid methyl esters are suitable for use as a cold-tolerant biodiesel.

14. The process of claim 12, wherein the organic solvent comprises a short-chain alcohol.

15. The process of claim 14, wherein the short-chain alcohol is a $C_{1-3}$ alcohol.

* * * * *